Jan. 1, 1935.    L. E. FOWLER    1,986,630
INTERNAL COMBUSTION ENGINE
Filed Jan. 30, 1930    2 Sheets-Sheet 1
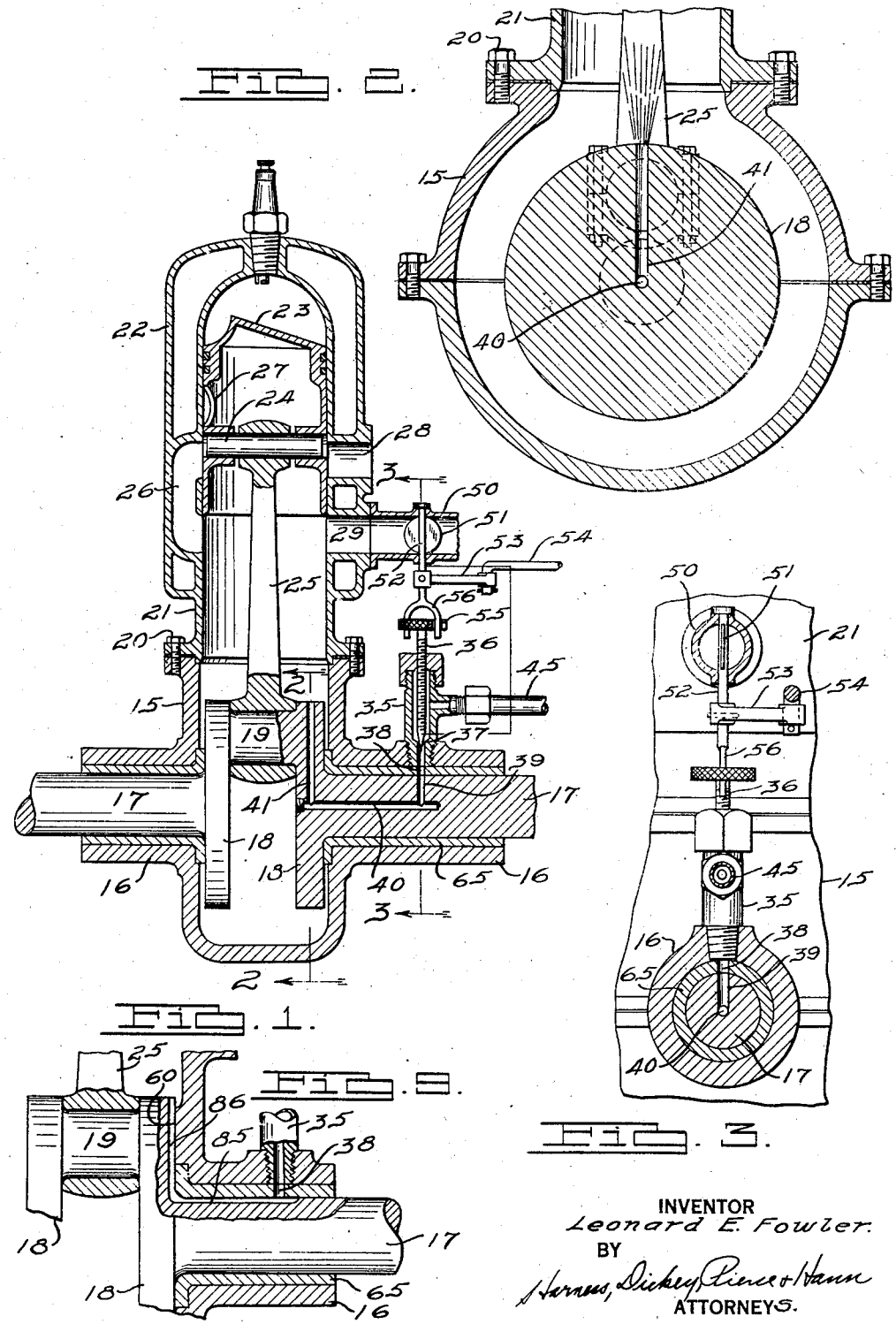
INVENTOR
Leonard E. Fowler.
BY
ATTORNEYS.

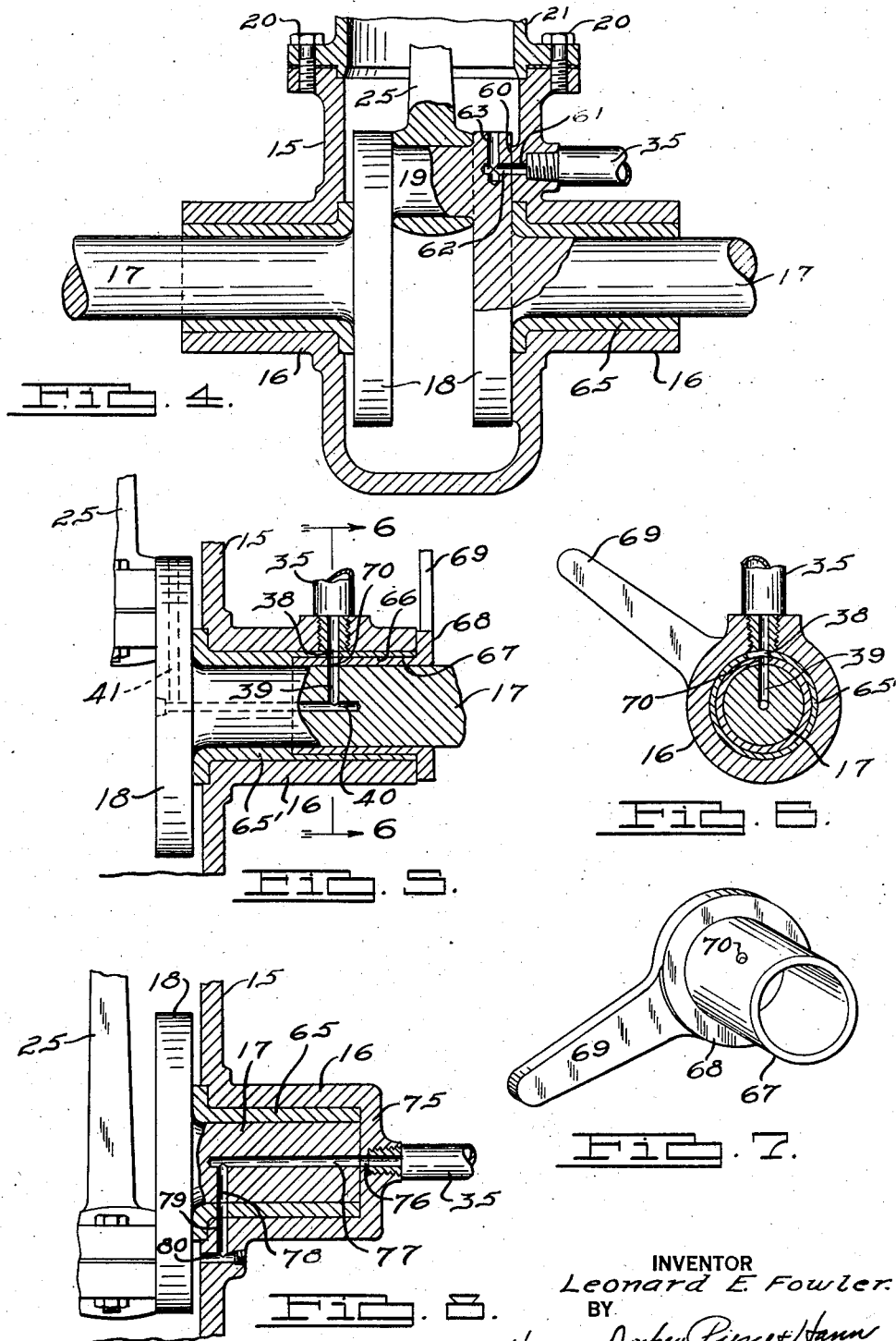

Patented Jan. 1, 1935

1,986,630

UNITED STATES PATENT OFFICE 1,986,630

INTERNAL COMBUSTION ENGINE

Leonard E. Fowler, Pontiac, Mich.

Application January 30, 1930, Serial No. 424,471

39 Claims. (Cl. 123—73)

This invention relates to internal combustion engines, and particularly to internal combustion engines of the two cycle type, the principal object being the provision of a new and novel means of carbureting such engines.

Another object is to provide means for carbureting a two cycle engine including means for introducing liquid fuel into the crank case before mixing it with air.

Another object is to provide a means for carbureting two cycle internal combustion engines in which the mixture of the fuel and air is accomplished within the crank case of the engine.

Another object is to provide a novel means for introducing fuel in the liquid state into the crank case of a two cycle internal combustion engine and there mix the fuel with air to form a combustible mixture.

Another object is to provide a novel metering device for metering fuel in the liquid state being fed to the crank case of a two cycle engine where the fuel is to be mixed with air.

Another object is to provide a novel means for introducing fuel in its liquid state into the crank case of an internal combustion engine and there causing the fuel to be mixed with air and vaporized.

Another object is to provide a method of carbureting two cycle internal combustion engines, which will obviate flooding of the crank case with liquid fuel.

Another object is to provide a novel means for controlling the ratio of air to fuel in an internal combustion engine of the two cycle type.

Another object is to provide a two cycle engine in which the crank shaft is formed to serve the additional function of controlling the supply of liquid fuel being fed to the engine.

Further objects will be apparent in the following specification, reference being had to the accompanying drawings, in which Fig. 1 is a vertical sectional view taken centrally through a single cylinder two cycle internal combustion engine longitudinally of the crank shaft thereof.

Fig. 2 is an enlarged fragmentary sectional view taken on the line 2—2 of Fig. 1.

Fig. 3 is an enlarged fragmentary sectional view taken on the line 3—3 of Fig. 1.

Fig. 4 is a fragmentary sectional view taken in a direction similar to Fig. 1 and showing a modified form of construction.

Fig. 5 is a fragmentary sectional view taken in the same plane as Fig. 1 and showing another modified form of construction.

Fig. 6 is a sectional view taken on the line 6—6 of Fig. 5.

Fig. 7 is a perspective view of the fuel control sleeve shown in connection with Figs. 5 and 6.

Fig. 8 is a fragmentary sectional view taken in the same plane as Fig. 1 and showing another modified form of construction.

Fig. 9 is a fragmentary sectional view taken in the same plane as Fig. 1, and showing another modified form of construction.

In conventional types of two cycle internal combustion engines, and in fact all two cycle engines except those operating on the Diesel principle, the fuel is carbureted prior to its introduction into the crank case where the mixture is compressed and then forced into the combustion chamber. The entrance of the combustible mixture into the crank case is controlled in various ways in conventional constructions, such as, for instance, by check valves or by ports whose opening and closing are controlled by movement of the piston. In all of these constructions in which a mixture of air and fuel is admitted to the crank case, there is a tendency for the liquid fuel particles to be separated out of the body of mixture in the crank case, and for the vaporized particles of the fuel to become condensed upon the walls of the crank case. For these reasons two cycle engines have been more or less unsatisfactory as far as flexibility is concerned, inasmuch as the loading condition is aggravated at low speeds, and due to the condensation of the fuel in the crank case it is difficult to maintain the correct proportions of air to fuel for optimum operating conditions throughout the various and varying ranges of speeds.

The present invention provides a construction by which loading of the crank case with liquid fuel is substantially eliminated, the passage of the fuel into the cylinder is insured, and proper metering of the fuel is insured at all times. Furthermore, this means is considerably more economical to employ than the conventional types of carburetors now used and, therefore, not only insures better engine operating conditions but is more economical as well. The invention is applicable to two cycle engines of any number or arrangement of cylinders, although I have shown a single cylinder engine in the drawings for the purpose of simplicity of description.

Referring to the accompanying drawings I show a two cycle engine comprising a crank case or base 15 provided at opposite sides with suitable bearing bosses 16 for journaling the main bearings 17 of the crank shaft. These bosses 16 are shown as being provided with conventional bearing bushings, the right hand one of which in Fig. 1 is indicated at 65. The crank shaft is shown as being provided with circular or disc-like throws 18 connected by the crank pin 19, although it will be apparent that the throws 18 may be made of any shape desired. Secured to the crank case 15 by bolts such as 20 is a cylinder 21, shown as being provided with a conventional water jacket 22. Within the cylinder 21 is slidably received a piston 23 of a type conventionally employed in two cycle engines. The piston 23 is connected by the wrist pin 24 to the connecting rod 25 which is connected at its opposite end to the crank pin 19. The cylinder 21 is provided with the usual pass-over port 26 which is adapted to co-operate with the port 27 formed in the piston 23 to by-pass the combustible mixture from the crank case 15 past the piston 23 into the cylinder above the piston when the piston is at and adjacent to the inner end of its stroke. The cylinder 21 is also provided with an exhaust port 28 which is uncovered by the piston when it is at and adjacent to the inner end of its stroke. The cylinder is further provided with an air inlet port 29 which is uncovered by the piston 23 when it is at and adjacent to the outer end of its stroke.

In accordance with the present invention I thread the body 35 of a needle valve into one of the bearing bosses 16 for the crank shaft. This needle valve is provided with a valve element 36 of conventional construction which is adapted to co-operate with a shoulder 37 in the casing 35 to control the passage of fuel through the casing 35, and which fuel is conducted thereto through a duct such as 45 from any suitable source of supply. The bushing 65 for the bearing boss 16 to which the needle valve is applied is drilled as at 38 in alignment with the aperture in the needle valve casing, and the crank shaft is drilled in a radial direction to provide an opening such as 39 which may be brought into alignment with the opening 38 upon proper rotation of the crank shaft. The opening 39 connects with an opening 40 formed axially in the crank shaft and which opening 40 in turn connects with another passage 41 which is formed radially in the corresponding throw 18 of the crank shaft. The opening 41 is preferably located approximately in a plane passing through the axis of the crank shaft and through the axis of the pin 19 as indicated in Fig. 2, or in advance of such plane in the direction of rotation of the crank shaft. The opening 39 is shown as being positioned in the same plane but, as will hereinafter be apparent, the position of the openings 38 and 39 may be varied circumferentially of the crank shaft as desired without any effect on the proper functioning of the apparatus so long as they are located for proper co-operation with each other.

In operation, when the engine is rotated and the piston 23 approaches the outer end of its stroke, and during which movement a suction is created within the crank case 15, the piston 23 uncovers the air intake port 29 and thus admits a charge of fresh air to the crank case. As the piston approaches its position of outer dead center, the opening 39 in the crank shaft turns into alignment with the opening 38 in the journal 16 and fuel is fed through the needle valve into the opening 39 where it flows into the passage 40 and then into the passage 41, and due to the centrifugal force acting upon it in the passage 41 is thrown radially outwardly of the crank shaft. Because the opening 41 is in substantial alignment with the axis of the pin 19 radially of the crank shaft, the fuel discharged from the opening 41 will be discharged toward the piston 23, and due to the force with which it is discharged from the crank shaft, particularly at higher engine speeds, it will become intimately mixed with the charge of air that is being drawn into the crank case through the air inlet port 29. Furthermore, it will be noted that this fuel is discharged toward the piston so that any liquid particles are impinged upon the hot under side of the piston. The advantage is that the fuel, in being directed into the interior of the piston, causes any unvaporized particles of fuel to be thrown against the head of the piston which, of course, is relatively hot and which, therefore, quickly vaporizes the same and assists in cooling the piston. As the crank continues to rotate the opening 39 is moved out of alignment with the opening 38, thus cutting off the supply of fuel, and the piston in moving downwardly first closes the port 29 and then compresses the mixture now contained within the crank case and lower part of the cylinder. As the piston approaches its lower dead center position the port 27 becomes aligned with the lower end of the by-pass port 26 and the compressed mixture is thus forced through the by-pass port 26 into the cylinder above the piston while the burnt products of combustion are forced out of the exhaust port 28.

It will be apparent that as the speed of the engine increases the time element during which the openings 38 and 39 are aligned decreases proportionately to the increase in speed, and in view of the fact that an increased amount of fuel is necessary for increased speeds, that this might be of a disadvantage. However, it will be noted that the passage 41 is of a greater length than the passage 39 and that, therefore, the centrifugal force acting on the fuel in these passages is greater in the passage 41. Furthermore, it will be apparent that the centrifugal force acting on the fuel in the passage 41 increases as the square of the speed. This compensates for the variation in the time during which the fuel is fed from the passage 38 to the passage 39 so that the net result is that the supply of fuel delivered into the crank case varies directly as the speed, and this is the condition desired for proper engine operation.

In order to control the speed of the engine I control the volume of air which flows through the air intake port 29. This may be accomplished by providing an air horn or other duct such as 50 connected to the air intake port 29, and providing a butterfly valve such as 51 within the air horn 50 suitably secured on a rotatable shaft such as 52. A lever 53 is secured to the shaft 52 and may be connected by a rod such as 54 to any suitable point of control, as in conventional practice.

In order to obtain a further control of the ratio of fuel to air, I prefer to locate the shaft 52 in axial alignment with the needle valve 36, and to provide a pair of openings such as 55 in the head of the valve member 36 and to provide a fork 56 on the lower end of the shaft 52, the ends of the fork being slidably received in the openings 55. This provides a connection between the butterfly valve 51 and the needle valve 36 whereby when the butterfly valve 51 is closed the needle valve 36 is rotated to reduce the amount of fuel that may flow past the shoulder 37, and when the butterfly valve 51 is opened up a greater supply of fuel is permitted to flow into the crank case through the needle valve. The particular connection between the butterfly valve and needle valve may, of course, be varied in a number of different ways without affecting this phase of the present invention.

The particular means shown in Figs. 1 to 3, inclusive, for controlling the flow of liquid fuel into the crank case may, of course, be varied in a number of different ways while still permitting the crank shaft to control or meter the liquid fuel. One modification is shown in Fig. 4. In this case, instead of bringing the fuel through the shaft 17, a track 60 is formed on the side of the crank case against which the corresponding throw 18 bears. An opening 61 is provided through the side of the crank case and opens on the track 60. The throw 18 is provided with a co-operating opening 62 which is adapted to align with the opening 61 when the crank shaft has been rotated to the proper position, and this opening is connected by another opening 63 with the periphery of the throw 18. The effect of this construction is identical to that previously explained except that the only centrifugal force acting on the fuel is that tending to produce a flow of the fuel outwardly of the passage 63. In other words, it eliminates the effect of the centrifugal force acting on the fuel in the passage 39 in the construction previously described. The needle valve 35 may be employed in conjunction with this construction, or it may be entirely eliminated as it may in the construction first described. The bushing 65 for the crank journal 17, and other parts of the construction shown in Figs. 1, 2 and 3, other than the particular form of liquid fuel passages shown in Fig. 4, may be employed in the identical form shown and described in Figs. 1, 2 and 3.

It will be apparent, of course, that the arc of the opening 39 on the surface of the crank shaft main bearing 17 may be varied in order to vary the quantity of fuel which may be fed through the crank shaft into the engine, and it will also be apparent that means may be provided for adjustably controlling the arc of travel of the crank shaft during which fuel is fed into the same as, for instance, in a manner similar to that hereinafter described in connection with Figs. 5, 6 and 7.

One construction for variably controlling the flow of fuel to the crank shaft is shown in Figs. 5, 6 and 7. In this case the bushing 65' for the bearing 16 is cut away at 66 and rotatably received between the main journal 17, and this cutaway portion of the bushing 65' is a sleeve 67 having a radially extending flange 68 at its outer end to which is secured a lever 69 that may be manually or otherwise moved to control the rotatable position of the sleeve 67. The sleeve 67, as best indicated in Figs. 6 and 7, is provided with a hole 70 which is adapted to align with both the openings 38 and 39 when the crank shaft is in its proper rotatable position. The opening 38 in the bushing 65' is shown, in this case, as being in the form of a circumferentially extending slot, but it will be apparent that the dimensions or shape of these openings may be varied as desired to obtain any length or characteristic of the fuel injection period.

With this construction it will be apparent that by suitably controlling the rotatable position of the sleeve 67 by means of the handle 69 the arc of rotation during which fuel is fed from the opening 38 to the opening 39 may be easily and quickly varied.

In some cases it may be desirable, in order to prevent possible leakage of fuel outwardly along the end of the crank shaft through which the fuel is fed, to provide means for preventing such leakage. Such a construction is shown in Fig. 8, in which case the bearing 16 is formed with a blind end 75. The fuel from the needle valve 35 in this case, instead of being brought through the periphery of the journal 17, is brought through the end 75 as at 76 in alignment with an opening 77 formed axially of the journal 17. This opening 77 connects with a radial opening 78 in the journal 17 adjacent the throw 18 and the opening 78 is adapted to become aligned with the opening 79 in the wall of the crank case 15 when the crank shaft has rotated to the proper position. The opening 79 connects with an opening 80 which communicates with the interior of the crank case 15. In this particular case the fuel is not thrown off of the periphery of the crank shaft in the same manner as that previously described, but nevertheless it is acted upon by the centrifugal force to which it is subjected in the passage 78, and furthermore, it may be directed against the side of the throw 18 as indicated, in which case it will be discharged from the periphery of the throw 18 in much the same manner as that previously described.

It is, of course, not essential that the various passages in the crank shaft be formed as drilled holes, as in some cases grooves in the surface of the crank shaft, or the equivalent of grooves, may be employed equally as well. Such a construction is shown in Fig. 9 which represents the construction shown in Fig. 4 thus modified. As indicated in Fig. 9 the fuel is conducted to the crank shaft in the same manner as in Fig. 1, but in this case instead of discharging the fuel to an axial opening in the crank shaft the fuel is discharged into a groove 85 formed in the surface of the journal 17 in axially parallel relation thereto, and the groove 85 connects with the groove 86 formed radially in the side of the throw 18 which contacts with the face 60. The net result is the same in this case as in those constructions above described.

Formal changes may be made in the specific embodiment of the invention described without departing from the spirit and substance of the broad invention, the scope of which is commensurate with the appended claims.

What I claim is:

1. The method of operating a two-cycle internal combustion engine which comprises introducing air into the crank case thereof, separately introducing liquid fuel into said crank-case under the influence of centrifugal force, separately controlling the relative amounts of said air and fuel, causing said air and fuel to be mixed in said crank-case, and then passing said mixture to the combustion chamber of said engine for ignition.

2. The method of operating a two-cycle internal combustion engine comprising introducing air into the crank-case thereof, separately introducing fuel in the liquid state into said crank-case under the influence of centrifugal force for mixture with said air therein, controlling the amount of said fuel in direct proportion to the speed of said engine, and then passing said mixture to the combustion chamber of said engine for ignition.

3. In an internal combustion engine, a crank-case, a crank-shaft rotatable therein, means for introducing air into said crank-case, and separate means for introducing fuel in the liquid state into said crank-case under the influence of centrifugal force for mixture with air therein.

4. In an internal combustion engine, a crank-case, a crank-shaft rotatable therein, means for introducing air into said crank-case, and means co-operating with said crank-shaft for introducing liquid fuel into said crank-case under the influence of centrifugal force for mixture with said air therein.

5. In an internal combustion engine, a crank-case, a crank-shaft rotatable therein, means for introducing air into said crank-case, and means for introducing fuel in the liquid state into said crank-case for mixture with said air comprising a passage formed in said crank-shaft.

6. In an internal combustion engine, a crank-case, a crank-shaft rotatable therein, means for introducing air into said crank-case, and means for introducing fuel in the liquid state into said crank-case for mixture with said air comprising a passage formed in said crank-shaft and co-operating with said crank-case to control the passage of said liquid fuel therethrough.

7. In an internal combustion engine, in combination, a crank-case, a crank-shaft rotatable therein, means for introducing air into said crank-case, and separate means for introducing fuel in the liquid state into said crank-case for mixture with said air therein comprising co-operating passages formed in said crank-case and crank-shaft respectively.

8. In an internal combustion engine, in combination, a crank-case having a bearing, a crank-shaft rotatable in said crank-case and journaled in said bearing, means for introducing air into said crank-case, and means for separately introducing fuel in the liquid state into said crank-case for mixture with said air comprising co-operating passageways in said bearing and journal.

9. In an internal combustion engine, in combination, a crank-case, a crank-shaft rotatable therein, means for introducing air into said crank-case, and means for introducing fuel into said crank-case under the influence of centrifugal force set up by rotation of said crank-shaft.

10. In an internal combustion engine, in combination, a crank-case, a crank-shaft rotatable therein, means for introducing air into said crank-case, and means for introducing fuel in the liquid state into said crank-case including co-operating passages in said crank-shaft and said crank-case, the discharge of said fuel into said crank-case occurring in a direction radial to the axis of rotation of said crank-shaft.

11. In an internal combustion engine, in combination, a crank-case, a crank-shaft rotatable therein, means for introducing air into said crank-case, and means for introducing fuel in the liquid state into said crank-case including co-operating passages in said crank-shaft and said crank-case discharging said fuel into said crank-case under the influence of centrifugal force set up by rotation of said crank-shaft.

12. In an internal combustion engine, in combination, a crank-case, a crank-shaft rotatable therein, a cylinder secured to said crank-case, a piston reciprocable in said cylinder and operatively connected to said crank-shaft, means for introducing air into said crank-case, and separate means for introducing fuel in the liquid state into said crank-case comprising passages formed in said crank-shaft and crank-case respectively co-operating to cause an intermittent flow of fuel into said crank-case.

13. In an internal combustion engine, in combination, a crank-case, a crank-shaft rotatable therein, a cylinder secured to said crank-case, a piston reciprocable in said cylinder and operatively connected to said crank-shaft, means for introducing air into said crank-case, and separate means for introducing fuel in the liquid state into said crank-case comprising passages formed in said crank-shaft and crank-case respectively co-operating to cause an intermittent flow of fuel into said crank-case in a direction radial to the axial line of said crank-shaft and in the general direction of said piston.

14. In an internal combustion engine, in combination, a crank-case, a crank-shaft rotatable therein and provided with a crank-pin, a cylinder secured to said crank-case, a piston reciprocable in said cylinder, a connecting rod connecting said piston and said crank-pin, means for introducing air into said crank-case, and means for introducing fuel in the liquid state into said crank-case comprising a passage in said crank-case and a co-operating passage in said crank-shaft, the last mentioned passage opening into said crank-case in a direction radial to the axis of said crank-shaft and in approximate radial alignment with said crank-pin.

15. In an internal combustion engine, in combination, a crank-case, a crank-shaft rotatable therein and provided with a crank-pin, a cylinder secured to said crank-case, a piston reciprocable in said cylinder, a connecting rod connecting said piston and said crank pin, means for introducing air into said crank-case comprising a port in said cylinder opened and closed by said piston and a valve for controlling the flow of air through said port in addition to said piston, means for introducing fuel in the liquid state into said crank-case comprising co-operating passages in said crank-case and crank-shaft, and means for affecting the flow of said fuel through said passages comprising a valve member co-operating with one of said passages and operatively connected to said valve for said air port for simultaneous movement therewith.

16. In an internal combustion engine, in combination, a cylinder, a chamber connected therewith, means for passing air through said chamber, and rotating means in said chamber having a radially disposed fuel passage therein for discharging fuel into said air to thereby carburize the same.

17. A vaporizing device comprising a chamber, a rotating member in said chamber, said member having a passage therein, and means for intermittently feeding liquid to said passage, said liquid in said passage being materially affected by centrifugal force due to rotation of said member whereby to aid in discharging said liquid from said passage into said chamber.

18. The method of operating a two-cycle internal combustion engine which comprises introducing air into the crank-case thereof, and separately introducing fuel into said crank-case under the influence of centrifugal force, for mixture with said air.

19. The method of operating an internal combustion engine comprising introducing air into a chamber communicating with the combustion chamber thereof, separately introducing fuel into the first mentioned chamber under the influence of centrifugal force, for mixture with said air, and then passing said mixture to said combustion chamber.

20. The method of operating an internal combustion engine comprising introducing air into a closed chamber communicating with the combustion chamber thereof, separately introducing fuel into the first mentioned chamber for mixture with said air under the influence of a force additional to the normal pressure difference created in said first mentioned chamber by operation of said engine and without the aid of external actuating means for movement of said fuel, and then passing said mixture to said combustion chamber.

21. The method of operating an internal combustion engine comprising introducing air into the crank case thereof, separately introducing fuel under the combined influence of suction and centrifugal force, for mixture with said air, and passing said mixture to the combustion chamber of said engine.

22. In an internal combustion engine, in combination, a crank-case, a crank shaft having a cheek rotatable therein, means for introducing air into said crank-case, said cheek having a fuel passage therein opening onto a peripheral face thereof, and means for supplying fuel to said passage.

23. The method of operating an internal combustion engine comprising introducing non-fuelized air into the crank case thereof, fuelizing said air by separately introducing a fuelizing substance into said crank case under the influence of a force additional to the normal pressure difference created in said crank case by operation of said engine and in addition to any external actuating means for movement of said fuel, and then passing said mixture to said combustion chamber.

24. The method of operating an internal combustion engine comprising introducing non-explosive air into the crank case thereof, fuelizing said air therein to form an explosive mixture by introducing a fuel substance into said crank case under a force created by rotation of the crankshaft of said engine, and passing said mixture to the combustion chamber of said engine for ignition.

25. The method of operating an internal combustion engine comprising introducing non-explosive air into the crank case thereof, fuelizing said air therein to form an explosive mixture by introducing a fuel substance into said crank case under a force directly created by the rotation of a journal of the engine crankshaft, and passing said mixture to the combustion chamber of said engine for ignition.

26. The method of operating an internal combustion engine comprising introducing non-explosive air into the crank case thereof, fuelizing said air therein to form an explosive mixture by introducing a fuel substance into said crank case under a force directly created by the rotation of a cheek of the engine crankshaft, and passing said mixture to the combustion chamber of said engine for ignition.

27. The method of operating an internal combustion engine comprising introducing non-explosive air into the crank case thereof, fuelizing said air therein to form an explosive mixture by introducing a fuel substance into said crank case under a force directly created by the rotation of a journal and a cheek of the engine crankshaft, and passing said mixture to the combustion chamber of said engine for ignition.

28. The method of operating an internal combustion engine comprising controlling the amount of air fed thereto for combustion purposes by movement of the piston means thereof, and controlling the amount of fuel fed thereto for mixture with said air directly by the crankshaft of said engine.

29. The method of operating an internal combustion engine comprising controlling the amount of air fed thereto for combustion purposes by movement of the crankshaft thereof, and separately controlling the amount of fuel fed thereto for mixture with said air by a journal of said crankshaft.

30. The method of operating an internal combustion engine comprising controlling the time of admitting air to the crankcase thereof directly by the piston means of said engine and the time of admitting fuel to the crankcase, for mixture with said air, directly by the crankshaft of said engine.

31. The method of operating an internal combustion engine comprising controlling the time of admitting air to the crankcase thereof and the volume of such air directly by the piston means of said engine and the time of admitting fuel to the crankcase, for mixture with said air, and the amount of such fuel, directly by the crankshaft of said engine.

32. The method of operating an internal combustion engine comprising introducing air into the crank case of said engine, and causing fuel to be separately introduced into said crankcase and to be mixed therein with said air by forces resulting from rotation of the crankshaft of said engine.

33. The method of operating an internal combustion engine comprising introducing air into the crank case of said engine, and causing fuel to enter said crank case for mixture with said air by the pumping action resulting from the rotation of the crankshaft of said engine.

34. The method of operating an internal combustion engine comprising introducing air into the crank case of said engine, and causing fuel to enter said crank case for mixture with said air by the suction resulting from the action of centrifugal force set up by the rotation of the crankshaft of said engine.

35. The method of operating an internal combustion engine comprising supplying air to the crank case of said engine, moving a fuel jet through said air in said crank case, supplying fuel to said jet for mixture with said air, and then passing said mixture to the combustion chamber of said engine for ignition therein.

36. The method of operating an internal combustion engine comprising supplying air to said engine, moving a fuel nozzle through said air at a speed sufficient to cause a material depression in the pressure in said nozzle, supplying fuel to said nozzle for mixture with said air, and passing said air to the combustion chamber of said engine for ignition therein.

37. In combination with an internal combustion engine having a crank case, a cylinder and a piston, said cylinder having a port therein in open communication with said crank case when said piston is at the outer end of its stroke for admitting air to said crank case, and means rotatable in said crankcase in accordance with the movement of said piston for controlling the admission of fuel into said crank case for mixture with said air.

38. In combination with an internal combustion engine having a crank case, a cylinder and a piston, said cylinder having a port therein in open communication with said crank case when said piston is at the outer end of its stroke for admitting air to said crank case, and means rotatable in said crankcase in accordance with the movement of said piston for controlling the admission of fuel into said crank case for mixture with said air, said means limiting said admission of said fuel to approximately within that time when said port is uncovered by said piston.

39. The method of operating an internal combustion engine having a combustion chamber and a second chamber operatively communicating therewith comprising introducing air into said second chamber at a predetermined point in the engine cycle and introducing fuel into said second chamber under the influence of centrifugal force for mixture with said air, compressing said mixture of air and fuel, and then delivering said compressed mixture to said combustion chamber.

LEONARD E. FOWLER.